United States Patent [19]
Huybrechts

[11] Patent Number: 5,852,123
[45] Date of Patent: Dec. 22, 1998

[54] GRAFT COPOLYMER WITH A UREA OR IMID FUNCTIONAL GROUP AS A PIGMENT DISPERSANT

[75] Inventor: Jozef Huybrechts, Oud-Turnhqut, Belgium

[73] Assignee: E. I. du Pont de Nemours and Company, Wilmington, Del.

[21] Appl. No.: 733,679

[22] Filed: Oct. 17, 1996

[51] Int. Cl.$^6$ ................................. C08F 265/10
[52] U.S. Cl. .......................... 525/282; 525/279
[58] Field of Search ..................... 525/282, 279

[56] References Cited

U.S. PATENT DOCUMENTS

| | | | |
|---|---|---|---|
| 4,032,698 | 6/1977 | Ashe | 526/14 |
| 4,048,207 | 9/1977 | Jones | 260/448.8 R |
| 4,070,388 | 1/1978 | Jones | 260/455 A |
| 4,119,478 | 10/1978 | Robertson | 106/288 Q |
| 4,680,352 | 7/1987 | Janowicz | 526/147 |
| 4,722,984 | 2/1988 | Janowicz | 526/123 |
| 4,985,522 | 1/1991 | Mathias et al. | 526/288 |
| 5,010,140 | 4/1991 | Antonelli et al. | 525/269 |
| 5,030,726 | 7/1991 | Noriyuki et al. | 540/460 |
| 5,045,616 | 9/1991 | Rauterkus et al. | 526/258 |
| 5,169,922 | 12/1992 | Hille et al. | 528/75 |
| 5,179,184 | 1/1993 | Tsuboniwa et al. | 526/305 |
| 5,231,131 | 7/1993 | Chu et al. | 524/504 |
| 5,264,530 | 11/1993 | Darmon et al. | 526/194 |
| 5,270,399 | 12/1993 | Czornij et al. | 525/327.6 |
| 5,362,826 | 11/1994 | Berge et al. | 526/194 |
| 5,371,151 | 12/1994 | Berge et al. | 525/377 |
| 5,424,364 | 6/1995 | Simms et al. | 525/170 |

*Primary Examiner*—Edward J. Cain
*Attorney, Agent, or Firm*—Hilmar L. Fricke

[57] ABSTRACT

A polymeric dispersant for pigments based on an acrylic graft copolymer wherein the graft copolymer has a weight average molecular weight of at least 1500 and has 2 to 97% by weight of a polymeric backbone and 97–2% by weight of macromonomer side chains attached to the backbone and wherein the graft copolymer has at least about 1 weight percent of an imid or urea functional dispersing substituent attached to the backbone, the macromonomer, or both the backbone and the macromonomer.

17 Claims, No Drawings

GRAFT COPOLYMER WITH A UREA OR IMID FUNCTIONAL GROUP AS A PIGMENT DISPERSANT

BACKGROUND OF THE INVENTION

This invention is directed to pigment dispersions comprising a graft copolymer having urea functional groups, imid functional groups, or both.

Coating compositions generally comprise a carrier liquid, a film forming polymer, a curing (crosslinking) agent, and various additives such as pigments, extenders, U.V. stabilizers, dispersion agents, etc. Pigments are insoluble particles which are dispersed in the carrier liquid to provide color, opacity, hardness, durability, and corrosion resistance. Pigments are typically finely ground natural, synthetic, inorganic, or organic particles, often in the form of a powder. Extenders are inexpensive fillers used to reduce cost, achieve durability, alter appearance, control rheology and influence other desirable properties. As used herein, the term pigment and pigment dispersant shall be understood to encompass extenders as well.

The coating of the pigment particle surface with the carrier liquid is referred to as wetting or dispersing the pigment, and the resultant mixture is referred to as a pigment dispersion. If the pigment is not properly dispersed, clusters of dry pigment particles held together by surface forces will be present, and this condition is know as agglomeration. The clusters of dry pigment particles may be broken up by the application of mechanical forces or by the addition of pigment dispersants that effect the interface between the carrier liquid and the pigment particles. Pigment dispersants, also known as dispersing agents, increase the stability of a suspension of pigments in a liquid medium. Pigment dispersants also affect the interface between the carrier liquid and the pigment particle, thereby reducing flocculation, which is the formation of clusters of pigment particles after the particles have been wetted.

It is an object of this invention to provide a novel pigment dispersant which comprises a graft copolymer having a macromonomer grafted onto a polymer backbone. The graft copolymer has urea functional groups, imid functional groups, or both located on the backbone, the macromonomer, or both. The preferred macromonomer is polymerized from acrylic monomers. It is a further object of this invention to provide a method of preparing graft copolymers comprising the polymerization of a monomer blend in the presence of a macromonomer prepared using a $Co^{2+}$ and/or $Co^{3+}$ chelate chain transfer agent. It was found that such graft copolymers are useful for making stable, non-flocculated pigment dispersions that provide superior pigment wetting.

SUMMARY OF THE INVENTION

The pigment dispersant of this invention comprises a graft copolymer having urea functional groups, imid functional groups, or both. The graft copolymer is formed by grafting a macromonomer onto a polymeric backbone of ethylenically unsaturated monomers. The macromonomer has one terminal ethylenically unsaturated group which reacts with the backbone monomers, thereby attaching the macromonomer to the backbone. The macromonomer may have urea functional groups, imid functional groups, or both.

The polymeric backbone comprises about 2 to 97 weight percent of the graft copolymer and the macromonomer comprises about 97 to 2 weight percent of the graft copolymer. The graft copolymer further comprises at least about 1 weight percent of a dispersing substituent selected from the group consisting of imid functional compounds, urea functional compounds, or both. The dispersing substituent, also known as an anchoring group because it anchors the polymer to the pigment surface, is attached to the graft copolymer by copolymerization with the backbone, the macromonomer, or both. The dispersing substituent can also be attached to the graft copolymer by reaction with functional groups on the backbone, the macromonomer, or both. In summary, the dispersing substituent may be imid functional compounds, urea functional compounds, or both and may be located on the backbone, the macromonomer, or both.

The urea functional compounds are represented by the formula

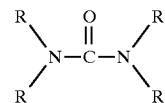

wherein each R is independently selected from the group consisting of hydrogen, saturated and unsaturated aliphatic and alicyclic compounds that may be substituted or unsubstituted, substituted and unsubstituted aromatic and heterocyclic compounds and divalent radicals including —NH—, oxygen and sulfur and wherein at least one R group comprises an unsaturated polymerizable group which will react with the monomers contained in the backbone, the macromonomer, or both or at least one R group contains a functional group that reacts with the reactive functionality of the backbone, the macromonomer, or both.

The imid functional compounds are represented by the formula

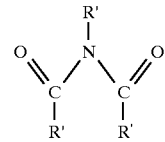

wherein each R' is independently selected from the group consisting of hydrogen, saturated and unsaturated aliphatic and alicyclic compounds that may be substituted or unsubstituted, substituted and unsubstituted aromatic and heterocyclic compounds and divalent radicals including —NH—, oxygen and sulfur and wherein at least one R' group comprises an unsaturated polymerizable group which will react with the monomers contained in the backbone, the macromonomer, or both or at least one R' group contains a functional group that reacts with the reactive functionality of the backbone, the macromonomer, or both.

The pigment dispersant of this invention is produced by grafting a macromonomer onto a polymeric backbone. The macromonomer is polymerized in the presence of a cobalt chain transfer agent, thereby producing macromonomers with one terminal ethylenically unsaturated group. The macromonomer is subsequently reacted with ethylencially unsaturated backbone monomers, which polymerize to form a backbone with macromonomer sidechains grafted thereto. The dispersing substituent may be added during the polymerization of the macromonomer, during the copolymerization of the macromonomer and the backbone monomers, or during both.

A pigment dispersion is readily formed by combining the pigment dispersant of this invention with any number of commercially available pigments and an appropriate liquid vehicle.

DETAILED DESCRIPTION OF THE INVENTION

The pigment dispersant of this invention comprises a graft copolymer formed by the copolymerization of ethylenically unsaturated backbone monomers in the presence of a macromonomer. The preferred macromonomers are polymerized from acrylic monomers, in particular methacrylate monomers. The macromonomers have a weight average molecular weight of about 300–30000, preferably from about 1000–10000, and a hydroxyl value of about 20–180.

To ensure that the resulting macromonomers only have one terminal ethylenically unsaturated group which will polymerize with the backbone monomers to form the graft copolymer, the macromonomer is polymerized in the presence of a cobalt chain transfer agent containing a $Co^{2+}$ group, a $Co^{3+}$ group, or both. Typically, the macromonomer is prepared by polymerizing a blend of methacrylate based monomers in the presence of a cobalt chain transfer agent. The macromonomer polymerization is carried out in an organic solvent or solvent blend using conventional polymerization catalysts. Preferred cobalt chain transfer agents or catalysts are described U.S. Pat. Nos. 4,680,352 and 4,722,984 to Janowicz. Most preferred cobalt chain transfer agents are pentacyano cobaltate (II), diaquabis (borondiflurodimethylglyoximato) cobaltate(II), and diaquabis (borondifluorophenylglyoximato) cobaltate (II). Typically, these chain transfer agents are used at concentrations of about 2–5000 ppm based upon the particular monomers being polymerized.

Typical polymerization catalysts are peroxy and azo derivatives. Most preferred are azo type polymerization catalysts such as 2,2-azobis (2-methylbutane nitrile); 2,2-azobis (2,4-dimethyl pentanenitile); and 2,2-azobis (2,4-dimethyl-4-methoxyvaleronitrile). Examples of peroxy based catalysts are di-tertiary butyl peroxide, di-cumyl peroxide, tertiary amyl peroxide, cumenehydroperoxide, di (n-propyl) peroxydicarbonate, tertiary amyl peracetate, and the like.

Typical solvents that can be used to form the macromonomer are ketones such as methyl ethyl ketone, isobutyl ketone, ethyl amyl ketone, and acetone; alcohols such as methanol, ethanol, isopropanol, and butanol; esters such as ethyl acetate and butylacetate; glycols such as ethylene glycol and propylene glycol; ethers such as tetrahydrofuran, ethylene glycol monobutyl ether, and propylene glycol methylether; and mixed ether acetates such as propylene glycol methylether acetate, diethylene glycol monobutyl ether acetate, and the like.

The macromonomer contains a single terminal ethylenically unsaturated group, and primarily contains polymerized monomers of methacrylic acid, its esters, amides, nitriles or mixtures of these monomers. Preferred monomers include alkyl methacrylates, cycloaliphatic methacrylates, aryl methacrylates, and hydroxy functional methacrylates.

Typical alkyl methacrylates that can be used have 1–18 carbon atoms in the alkyl group such as methyl methacrylate, ethyl methacrylate, n-butyl methacrylate, i-butyl methacrylate, t-butyl methacrylate, 2-ethyl hexyl methacrylate, lauryl methacrylate, stearyl methacrylate, and the like.

Cycloaliphatic methacrylates can be used such as trimethylcyclohexyl methacrylate, cyclohexyl methacrylate, isobomyl methacrylate, tertiary butyl cyclohexyl methacrylate and the like.

Aryl methacrylates can be used as phenyl methacrylate, benzyl methacrylate, and the like. Hydroxy functional methacrylates can be used such as 2-hydroxyethyl methacrylate, 2-hydroxypropyl methacrylate, 4-hydroxylbutyl methacrylate, and the like.

Examples of amide and nitrile monomers are methacrylamide, methacrylonitrile, n-butoxy methyl methacrylamide, methoxy methyl methacrylamide, methoxy methacrylamide, and the like. Examples of acid functional monomers are methacrylic acid, methacryloxyethyl phosphate, sulfoethyl methacrylate and the like. Epoxy functional monomers can also be copolymerized such as glycidyl methacrylate.

Other ethylenically unsaturated derivatives can be used for forming the macromonomer such as alkyl acrylates, cycloaliphatic acrylates, hydroxy acrylates, aryl acrylates, and vinyl aromatics. Preferred alkyl acrylates have 1–18 carbon atoms in the alkyl group such as methyl acrylate, ethyl acrylate, n-butyl acrylate, i-butyl acrylate, t-butyl acrylate 2-ethyl hexyl acrylate, lauryl acrylate, and the like.

Cycloaliphatic acrylates can be used such as t-butyl cyclohexyl acrylate, cyclohexyl acrylate, and the like. Hydroxyl acrylates can be used such as 2-hydroxyethyl acrylate, 2-hydroxypropyl acrylate 4-hydroxybutyl acrylate, and the like. Aryl acrylate such as benzyl acrylate and vinyl aromatics such as styrene, t-butyl styrene, and vinyl toluene can be copolymerized.

Other ethylenically unsaturated derivatives can be used for forming the macromonomer such as sulfonic, sulfinic, phosphonic, phosphonic acids and ester derivatives; isocyanates; anhydrides; nitriles; amides; amines; and silanes. Examples include but are not limited to maleic anhydride, itaconic anhydride, isocyanatoethyl methacrylate acrylonitrile, acrylamide, dimethyl amino ethyl acrylate, 2-acrylamido-2-methylpropane sulfonic acid, trimethoxysilyl propyl methacrylate, and the like.

The macromonomer can be chemically modified via reaction of its functional groups. An acid or amine functional macromonomer can be modified with epoxy functional derivatives. An hydroxyfunctional macromonomer can be further reacted with an isocyanate functional derivative. Lactones such as E-caprolactone can be reacted with OH and NH functionalities on the graft copolymer.

Functional groups that can be built in the graft copolymer structure include hydroxyl groups; acids such as carboxylic acid, sulfonic acid, and phosphoric acid; amides; alkoxymethylamides; isocyanates; silanes; alkoxysilanes; amines; epoxies; acetoacetoxies; and the like. The functional groups can be placed on the backbone, the macromonomer, or both by copolymerization of a suitable functional ethylenically unsaturated monomer.

The backbone contains polymerized monomers and any of the monomers listed above for use in the macromonomer may also be used in the backbone. The backbone monomers are copolymerized with the macromonomers using conventional azo or peroxide type catalysts and organic solvents as described above. The graft copolymer thus formed has a weight average molecular weight of at least 1500 and has urea or imid functional groups in the backbone, the macromonomer, or both.

A dispersing substituent having urea functionality, imid functionality, or both urea and imid functionality can be added to the graft copolymer by reacting the functional groups on the backbone, the macromonomer, or both with urea and/or imid functional derivatives. The urea and/or imid functionality can also be obtained by adding ethylenically unsaturated imid and/or urea functional monomers during the polymerization of the macromonomer, the backbone, or both. The graft copolymer has a hydroxy value of about 20–180. Table I summarizes the various functional group combinations and locations for the graft copolymer.

TABLE I

Copolymer Functionality Matrix

| Case | Functionality | Location |
|------|---------------|----------|
| 1 | imid | macromonomer |
| 2 | urea | macromonomer |
| 3 | imid & urea | macromonomer |
| 4 | imid | backbone |
| 5 | urea | backbone |
| 6 | imid & urea | backbone |
| 7 | imid | macromonomer & backbone |
| 8 | urea | macromonomer & backbone |
| 9 | imid & urea | macromonomer & backbone |

Cases 4 and 5 are the preferred embodiments and are represented by Examples 7 and 13, respectively. The most preferred embodiment is case 4. Cases 7–9 require an excess of either urea or imid functionality on either the backbone or the macromonomer, such that the location of the excess dispersing substituent is the primary anchoring point for the pigment particles The imid functional compounds useful in this invention are represented by the formula:

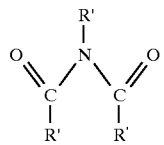

and the urea functional compounds are represented by the formula:

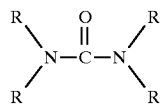

wherein each R and each R' is independently selected from the group consisting of hydrogen; saturated, substituted aliphatic and alicyclic compounds; saturated, unsubstituted aliphatic and alicyclic compounds; unsaturated, substituted aliphatic and alicyclic compounds; unsaturated, unsubstituted aliphatic and alicyclic compounds; substituted aromatic and heterocyclic compounds; unsubstituted aromatic and heterocyclic compounds; and divalent radicals including —NH—, oxygen and sulfur.

Examples of R and R' aliphatic compounds include methyl, ethyl, propyl, n-butyl, and the like. Examples of R and R' alicyclic compounds include cyclohexyl, methyl cyclohexyl, and the like. Examples of R and R' aromatic compounds include phenyl, benzyl p-toluyl and the like. Examples of R and R' heterocyclic compounds include morpholines, benzimidazoles, triazoles, imidazoles, piperazines, pyridines, pyrimidines, and the like. In particular, the reaction of 1-(2-aminoethyl)piperzaine; 2-aminoethyl morpholine; 4-(2-aminoethyl) pyridine; or 3-amino-1,2,4-triazole with an isocyanate functional monomer to produce a urea substituted heterocyclic pigment interactive group.

Examples of ethylenically unsaturated urea monomers are described in U.S. Pat. Nos. 5,030,726 and 5,045,616. Preferred monomers are the acrylate derivatives of 2-hydroxyethyl ethylene urea (HEEU), methacrylate derivatives of HEEU, acrylamide derivatives of 2-aminoethylethlene urea (AEEU), and methacrylamide derivatives of AEEU.

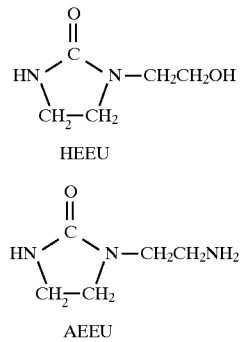

HEEU

AEEU

The most preferred monomer commercially available is methacryloxyethyl ethylene urea:

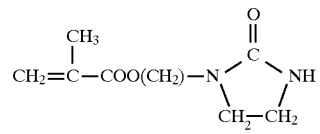

In a preferred embodiment, the graft copolymer comprises about 5 weight percent methacryloxyethyl ethylene urea, about 5 to 50 weight percent of the polymeric backbone monomers, and about 50–95 weight percent of the macromonomer.

Examples of imid functional monomers are derivatives of maleic anhydride such as phenyl maleimide, methyl maleimide, ethyl maleimide, benzyl maleimide, and the like.

Examples imid functionality obtained by chemical reaction of functional groups include the reaction of epoxy functional macromonomers or backbone with imids such as succinimid, phtalimid, and the like. In a preferred embodiment, the graft copolymer comprises about 5 weight percent of the reaction product of glycidylmethacrylate and phtalimid, about 5 to 50 weight percent of the polymeric backbone monomers, and about 50–95 weight percent of the macromonomer.

Examples of urea functionality obtained by chemical reaction of functional groups include the reaction of dimethyl m-isopropenyl benzyl isocyanate (MTMI) or isocyanato ethyl methacrylate (IEMA) with HEEU or AEEU to form an unsaturated polymerizable monomer in which the urea is attached via a urethane (HEEU) or urea group. The reaction of MTMI with AEEU is shown in Equation 1 and the reaction of IEMA with HEEU is shown in Equation 2. The reaction of MTMI with HEEU and the reaction of IEMA with AEEU are not specifically illustrated, but are within the scope the this invention.

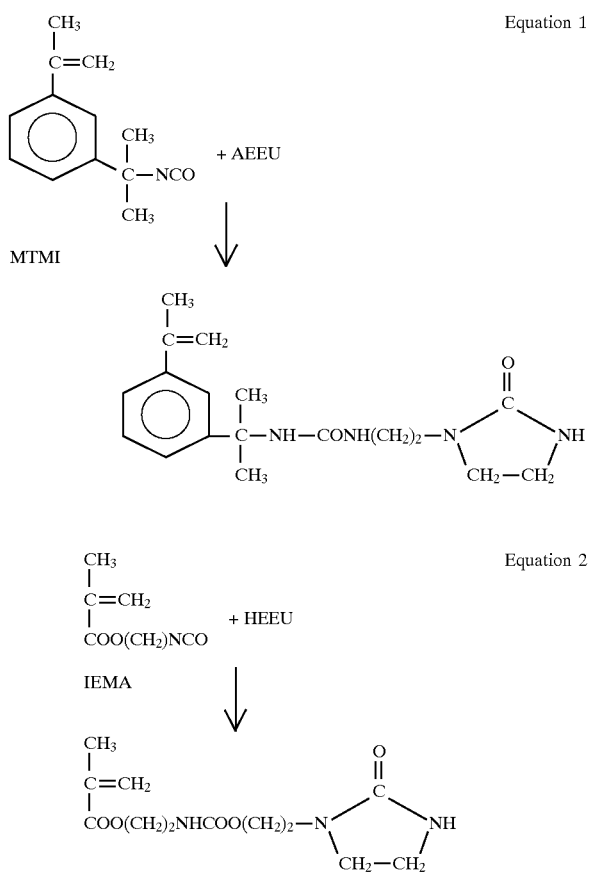

Equation 1

Equation 2

The graft copolymer should contain preferably more than 1 weight % of a urea functional group, an imid functional group, or both as calculated from the overall composition of the graft copolymer. The calculation can be made from the chemical composition of the urea and/or imid functional group present in the binder.

The weight percent is expressed as the percentage of

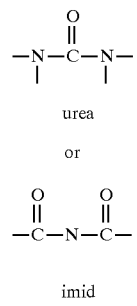

urea or imid present in the binder.

Such graft copolymers can be used to form a pigment dispersion or a millbase. Pigments are added to the graft copolymer in the solvent or blend and are dispersed using conventional techniques such as high speed mixing, ball milling, sand grinding, attritor guiding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridons, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of coating compositions such as primers, primer surfacers, topcoats which may be monocoats, or basecoats of a clearcoat/basecoat finish. These compositions may contain crosslinking agents such as blocked isocyanates, alkylated melamines, polyisocyanates, epoxy resins, and the like. Preferably, the graft copolymer contains functional groups that will become part of the final network structure by reacting with the crosslinkers.

The following examples illustrate the invention. All parts and percentages are on a weight basis unless otherwise indicated. Molecular weights are determined by gel permeation chromatography using polystyrene as the standard and tetrahydrofuran as the carrier solvent. All viscosity measurements are reported using the Gardner Holdt scale. MN represents number average molecular weight and MW represents weight average molecular weight. Acid value was measured using a titration method with an alcoholic KOH solution and phenolphtaine as indicator. Solids content was measured after one hour at 105° C.

EXAMPLES

Example 1

Macromonomer

This example illustrates the preparation of a macromonomer according this invention. A reactor was equipped with a stirrer, thermocouple, and condenser. The reactor was held under nitrogen positive pressure and the following ingredients were employed.

| | Parts by weight |
|---|---|
| Part 1 | |
| Butyl acetate | 19 |
| 2-Ethyl hexyl methacrylate | 30 |
| 2-Hydroxyethyl methacrylate | 7 |
| Part 2 | |
| Catalyst-diaquabis (borondifluorodiphenyl-glyoximato) cobaltate II | 0.002 |
| Methyl ethyl ketone | 1.998 |
| Butyl acetate | 1.97 |
| VAZO ® 88 initiator* | 0.03 |
| Part 3 | |
| Butyl acetate | 0.25 |
| Part 4 | |
| 2-Ethyl hexyl methacrylate | 22 |
| 2-Hydroethyl methacrylate | 6 |
| VAZO ® 88 initiator | 0.10 |
| Butyl acetate | 5.9 |

|  | Parts by weight |
| --- | --- |
| Part 5 |  |
| Butyl acetate | 0.5 |
| Part 6 |  |
| VAZO ® 88 initiator | 0.03 |
| Butyl acetate | 1.97 |
| Part 7 |  |
| Butyl acetate | 0.25 |
| Part 8 |  |
| t-Butyl peroxy 2-ethyl hexanoate | 0.02 |
| Butyl acetate | 1.98 |
| Part 9 |  |
| Butyl acetate | 1 |
| TOTAL | 100 |

*VAZO ® 88 is 1,1-azobis (cyclohexanecarbonitrile) free radical polymerization initiator available from E.I. DuPont de Nemours and Company of Wilmington, DE.

Part 1 was charged to the reactor and heated at about 150° C. reflux temperature. Part 2 was added to the reactor as a single shot feed followed by part 3 as rinsing step. Part 4 was subsequently fed to the reactor over a 4 hour period. The reactor contents were rinsed with part 5 were subsequently held at reflux for 30 minutes. Part 6 was fed to the reactor over a 1 hour period. The reactor contents were rinsed with part 7 and subsequently held for 1 hour at reflux. Part 8 followed by part 9 were added and the reactor, and the contents were allowed to cool to room temperature.

| Test results | Solids | 62.5% |
| --- | --- | --- |
|  | Viscosity | T |
|  | Acid value | 0.5 |
|  | MN | 5400 |
|  | MN | 10000 |

Example 2

Macromonomer

Procedure of example 1 was repeated with following changes:

Part 1: 2-Ethylhexyl methacrylate 30 wt % was replace by 2-Ethylhexyl methacrylate 11.25 wt % and Isobornyl methacrylate 18.75 wt %.

Part 4: 2-Ethylhexyl methacrylate 22 wt % was replaced by 2-Ethylhexyl methacrylate 8.25 wt % and Isobornyl methacrylate 13.75 wt %.

| Test results | Solids | 63.5% |
| --- | --- | --- |
|  | Viscosity | Z2 |
|  | Acid value | 1.8 |
|  | MN | 5000 |
|  | MW | 9000 |

Example 3

Macromonomer

Procedure of example 1 was repeated with 2-Ethyl hexyl methacrylate replaced by methyl methacrylate and 2-Hydroxy ethylmethacrylate replaced by 2-Hydroxy propyl methacrylate.

| Test results | Solids | 61.9% |
| --- | --- | --- |
|  | Viscosity | Z + ½ |
|  | Acid value | 0.3 |
|  | MN | 1100 |
|  | MW | 2200 |

Example 4

Macromonomer

Procedure of example 1 was repeated with following changes:

|  | Parts by weight |
| --- | --- |
| Part 1 |  |
| Butyl acetate | 19 |
| 2-Ethyl hexyl methacrylate | 8.125 |
| 2-Hydroxyethyl methacrylate | 8.125 |
| Isobornyl methacrylate | 16.25 |
| Part 2 |  |
| Catalyst | 0.0052 |
| Methyl ethyl ketone | 1.9958 |
| Butyl acetate | 1.97 |
| VAZO ® 88 initiator | 0.03 |
| Part 4 |  |
| 2-Ethyl hexyl methacrylate | 8.125 |
| 2-Hydroxyethyl methacrylate | 8.125 |
| VAZO ® 88 initiator | 0.10 |
| Butyl acetate | 5.9 |
| Isobornyl methacrylate | 16.25 |
| All other parts as example 1. |  |
| Test results    Solids | 62.2% |
| Viscosity | U + ¼ |
| Acid value | 2.1 |
| MN | 2300 |
| MW | 4000 |

Comparative Example 5

Macromonomer

This example illustrates the synthesis of a polyester based macromonomer by ring opening polycondensation.

|  | Parts by weight |
| --- | --- |
| Part 1 |  |
| 2-Hydroxyethyl methacrylate | 130 |
| Butyl acetate | 370.35 |
| Methoxyhydroquinone | 0.65 |
| Part 2 |  |
| Methylhexahydrophtalic anhydride | 672 |
| Part 3 |  |
| Butyl acetate | 30 |
| Part 4 |  |
| Cardura E10* | 1130 |
| Part 5 |  |
| Butyl acetate | 50 |
| Part 6 |  |
| Dimethylbenzylamine | 1.8 |
| Butyl acetate | 8.2 |

|  | Parts by weight |
|---|---|
| Part 7 | |
| Butyl acetate | 7 |
| TOTAL | 2400 |

*Cardura E10 is the trademark for a versatic acid glycidylester available from the Shell Chemical Company.

Part 1 was heated to about 130° C. reflux. Part 2 followed by part 3 were added, and the reactor contents were held at reflux for 10 min. Part 4 followed by part 5 were added, and the reactor contents were held at reflux until the acid value dropped below 5. Part 7 was further added.

| Test results | Solids | 79.9% |
|---|---|---|
| | Viscosity | K |
| | Acid value | 0.3 |
| | MN | 1370 |
| | MW | 1780 |

Comparative Example 6

Macromonomer

Procedure of example 5 was repeated with the following substituted as part 1: 185 parts of tertiarybutylaminoethyl methacrylate, 400.075 parts of butyl acetate, and 0.925 parts of methoxyhydroquinone.

| Test results | Solids | 76.4% |
|---|---|---|
| | Viscosity | K |
| | Acid value | 3.4 |
| | MN | 1420 |
| | MW | 2130 |

Example 7

Graft Copolymer With Urea Functional Group

The following constituents were charged into a two liter flask equipped in example 1 to form a graft copolymer solution.

|  | Parts by weight |
|---|---|
| Part 1 | |
| Macromonomer example 1 | 100 |
| Part 2 | |
| Styrene | 19.5 |
| Butyl acrylate | 6.5 |
| 2-Hydroxyethyl methacrylate | 13 |
| Plex 6844-0* | 26 |
| Trigonox 42S** | 1.3 |
| Butyl acetate | 8.7 |
| Part 3 | |
| Butyl acetate | 2 |
| Part 4 | |
| Trigonox 42S | 0.15 |
| Butyl acetate | 4.85 |
| Part 5 | |
| Butyl acetate | 1 |

|  | Parts by weight |
|---|---|
| Part 6 | |
| Butyl acetate | 17 |
| TOTAL | 200 |

*A 25% solution of ethylene urea ethyl methacrylate in methyl methacrylate available from Huls Chemical Company of Germany.
**Tertiary butyl peroxy 3,3,5-isononanoate from AKZO Corp. of Holland.

Part 1 was brought to reflux (±135° C.), and part 2 was fed over a period of 3 hours and was followed by part 3 as a rinsing step. After holding 20 minutes at reflux, part 4 was added over 30 minutes and was followed by part 5 as a rinsing step. The contents of the flask were further held 1 hour at reflux, and part 6 was added.

| Test results | Solids | 65.8% |
|---|---|---|
| | Viscosity | higher than Z6 |
| | Acid value | 1.4 |
| | MN | 6820 |
| | MW | 20800 |

Example 8

Graft Copolymer With Urea Functional Group

Procedure for example 7 was repeated:

|  | Parts by weight |
|---|---|
| Part 1 | |
| Macromonomer example 1 | 70 |
| Part 2 | |
| Styrene | 11.7 |
| 2-Hydroxyethyl methacrylate | 3.25 |
| Nourycryl MA123 M50* | 16.25 |
| Trigonox 42S** | 0.8 |
| Butyl acetate | 3.7 |
| Part 3 | |
| Butyl acetate | 1 |
| Part 4 | |
| Trigonox 42S | 0.1 |
| Butyl acetate | 1.9 |
| Part 5 | |
| Butyl acetate | 1 |
| Part 6 | |
| Butyl acetate | 2 |
| TOTAL | 100 |

*A 50% solution of ethylene urea ethyl methacrylate in methyl methacrylate available from AKZO Corp. of Holland.
**Tertiary butyl peroxy-2-ethyl hexanoate from AKZO Corp of Holland.

| Test results | Solids | 66.6% |
|---|---|---|
| | Viscosity | Z5 + ½ |
| | Acid value | 1.8 |
| | MN | 2400 |
| | MW | 5300 |

Comparative Example 9

A Linear Copolymer With Composition As Example 7

Procedure for example 7 was repeated:

|  | Parts by weight |
|---|---|
| Part 1 | |
| Butyl acetate | 35 |
| Part 2 | |
| Styrene | 19.5 |
| Butyl acrylate | 6.5 |
| 2-Hydroxyethyl methacrylate | 26 |
| Plex 6844-0 | 26 |
| 2-Ethylhexyl methacrylate | 52 |
| Trigonox 42S | 2.6 |
| Butyl acetate | 7.4 |
| Part 3 | |
| Butyl acetate | 2 |
| Part 4 | |
| Trigonox 42S | 0.15 |
| Butyl acetate | 4.85 |
| Part 5 | |
| Butyl acetate | 1 |
| Part 6 | |
| Butyl acetate | 33 |
| TOTAL | 216 |

| Test results | Solids | 59.4% |
|---|---|---|
|  | Viscosity | Z4 |
|  | Acid value | 1.4 |
|  | MN | 9000 |
|  | MW | 34500 |

Comparative Example 10

Graft Copolymer With Acid Functional Groups

Procedure for example 7 was repeated with Plex 6844-0 replaced by 26 parts of 25% solution of acrylic acid in methylmethacrylate.

| Test results | Solids | 64.8% |
|---|---|---|
|  | Viscosity | higher than Z6 |
|  | Acid value | 39 |
|  | MN | 6500 |
|  | MW | 19300 |

Comparative Example 11

Graft Copolymer With Amine Functional Groups

Procedure for example 7 was repeated with Plex 6844-0 replaced by 26 parts of 25% solution of diethylaminoethyl methacrylate in methylmethacrylate. Trigonox 42S was replaced by VAZO® 88 initiator.

| Test results | Solids | 64.8% |
|---|---|---|
|  | Viscosity | Z + ⅓ |
|  | Acid value | 0.6 |
|  | MN | 4800 |
|  | MW | 9600 |

Comparative Example 12

A Graft Copolymer Based on a Polyester Macromonomer of Example 5

|  | Parts by weight |
|---|---|
| Part 1 | |
| Solvesso 100* | 20 |
| Part 2 | |
| Polyester macromonomer example 5 | 36 |
| 2-Hydroxypropyl methacrylate | 8.4 |
| Plex 6844-00 | 24 |
| Acrylic acid | 0.6 |
| Trigonox B** | 0.6 |
| Solvesso 100 | ¾ |
| Part 3 | |
| Solvesso 100 | 1 |
| Part 4 | |
| Butyl acetate | 6 |
| TOTAL | 100 |

*An aomatic solvent blend available from Exxon Chemical of the United States.
**Di tertiary butylperoxide available from AKZO Corp. of Holland.

Part 1 was heated to reflux (±168° C.), and part 2 was added over 3 hours and was followed by part 3 as a rinsing step. After refluxing the reactor contents for 2 hours, part 4 was added.

| Test results | Solids | 59.2% |
|---|---|---|
|  | Viscosity | Z4 |
|  | Acid value | 5.8 |
|  | MN | 3000 |
|  | MW | 10000 |

Example 13

Graft Copolymer with an Imid Functional Group

Procedure of example 1 was followed through the addition of part 6.

|  | Parts by weight |
|---|---|
| Part 1 | |
| Macromonomer example 1 | 100 |
| Part 2 | |
| Styrene | 26 |
| Methyl methacrylate | 15.6 |
| 2-Hydroxyethyl methacrylate | 13 |
| Glycidyl methacrylate | 5.2 |
| Trigonox 42S | 1.3 |
| Butyl acetate | 8.7 |
| Part 3 | |
| Butyl acetate | 2 |
| Part 4 | |
| Trigonox 42S | 0.15 |
| Butyl acetate | 4.85 |
| Part 5 | |
| Butyl acetate | 1 |
| Part 6 | |
| Butyl acetate | 8.3 |

-continued

| | Parts by weight |
|---|---|
| After Part 6, the following ingredients were added to the reactor: | |
| Phtalimid | 5.2 |
| Butyl acetate | 1 |
| Benzyl trimethylammonium hydroxide 40% in methanol | 1.04 |
| Butyl acetate | 6.66 |
| The contents of the reactor was held at 100 C. until the acid value dropped below 2. | |
| TOTAL | 200 |

| Test results | Solids | 65.6% |
|---|---|---|
| | Viscosity | Z3 + ½ |
| | Acid value | 1.5 |
| | MN | 5800 |
| | MW | 13400 |

Comparative Example 14
A Linear Copolymer with the Overall Composition of Example 13.

The procedure of comparative example 9 was followed through the addition of part 4.

| | Parts by weight |
|---|---|
| Part 1 | |
| Solvesso 100 | 12 |
| Part 2 | |
| Styrene | 12 |
| 2-Hydroxyethyl methacrylate | 12 |
| 2-Ethylhexyl methacrylate | 22.8 |
| Glycidyl methacrylate | 6.6 |
| Part 3 | |
| Solvesso 100 | 1 |
| Part 4 | |
| Butyl acetate | 15.3 |
| After the addition of part 4, the reactor contents were heated to 100° C. and following ingredients added in order: | |
| Phtalimid | 6.6 |
| Butyl acetate | 1 |
| Benzyl trimethylammonium hydroxide 40% in methanol | 1.32 |
| Butyl acetate | 2.38 |
| TOTAL | 100 |
| The contents of the reactor was held at 100 ° C. until the acid value dropped below 2 | |

| Test results | Solids | 59.8% |
|---|---|---|
| | Viscosity | J – ⅓ |
| | Acid value | 1 |
| | MN | 1600 |
| | MW | 4000 |

By forming dispersions using several pigments, the various acrylic based graft copolymers were compared to linear copolymers and to graft copolymers based on polyester macromonomers. In this test a certain weight of polymer (see table) was mixed with 30 grams of sand, 40 grams of xylene and 4.5 grams of pigment. This blend was shaken for 30 minutes on a Red Devil paint shaker produced by Red Devil Tools. Afterwards the pigment dispersion was rated as followed:

0 no flocculation
1 slight flocculation
2 moderate flocculation
3 severe flocculation Following pigments were tested:

Pigment 1: Special black 4 from Degussa of Germany.
Pigment 2: Perrindo maroon 6436 from Bayer of Germany.
Pigment 3: Monastral green Log C from Zeneca of Holland.
Pigment 4: Irgazin blue X3627 from Ciba of Switzerland.

TABLE II

| | | Dispersion Flocculation | | | |
|---|---|---|---|---|---|
| Binder according | Grams | Pigment 1 | Pigment 2 | Pigment 3 | Pigment 4 |
| Example 7 | 0.7 | | 0 | | |
| Example 7 | 4.5 | 0 | | | |
| Comp. example 9 | 0.7 | | 2 | | |
| Comp. example 9 | 4.5 | 3 | | | |
| Example 8 | 1.4 | 0 | 0 | 1 | 1 |
| Example 8 | 0.7 | 0 | 0 | 1–2 | 1–2 |
| Comp. example 9 | 1.4 | 3 | 2 | 2 | 2 |
| Comp. example 10 | 0.7 | 1–2 | 1 | 2 | 2 |
| Comp. example 11 | 0.7 | 1–2 | 0–1 | 2 | 3 |
| Comp. example 11 | 4.5 | 2 | | | |
| Comp. example 12 | 0.7 | 3 | 2 | 3 | 2–3 |
| Example 13 | 1.4 | 0 | | | |
| Example 13 | 0.7 | | | | |
| Comp. example 14 | 1.4 | 2 | | | |
| Comp. example 14 | 0.7 | | 1 | | |

The test results indicate that a graft acrylic copolymer with urea and/or imid functional groups are superior pigment dispersants as compared to linear polymers with or without the same functional groups. The examples also indicate that graft copolymer having urea and/or imid functional groups and based on acrylic macromonomers are superior pigment dispersants as compared to graft copolymers having urea and/or imid functional groups and based on polyester macromonomers.

Various modifications, alterations, additions or substitutions of the components of the compositions of this invention will be apparent to those skilled in the art without departing from the scope and spirit of this invention. This invention is not limited by the illustrative embodiments set forth herein, but rather the invention is defined by the following claims.

I claim:

1. A pigment dispersant, comprising:

(a) from about 2 to 97 weight percent of a polymeric backbone of ethylenically unsaturated monomers;

(b) from about 97 to 2 weight percent of a macromonomer having one terminal ethylenically unsaturated group, said macromonomer grafted onto said backbone by said terminal group; and (c) at least about 1 weight percent of a dispersing substituent attached at a location selected from the group consisting of the backbone, the macromonomer, and both the backbone and the macromonomer, said dispersing substituent selected from the group consisting of i) imid functional compounds represented by the formula

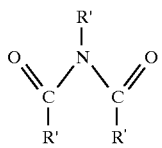

ii) urea functional compounds represented by the formula

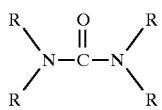

and iii) mixtures of i) and ii),
wherein each R and each R' is independently selected from the group consisting of hydrogen; saturated, substituted aliphatic and alicyclic compounds; saturated, unsubstituted aliphatic and alicyclic compounds; unsaturated, substituted aliphatic and alicyclic compounds; unsaturated, unsubstituted aliphatic and alicyclic compounds; substituted aromatic and heterocyclic compounds; unsubstituted aromatic and heterocyclic compounds; and divalent radicals including —NH—, oxygen and sulfur.

2. The dispersant of claim 1 wherein at least one R group and at least one R' group contain a reactive group selected from the group consisting of
 a) functional groups that react with a reactive functional group located on the backbone, the macromonomer, or both the backbone and the macromonomer, and
 b) unsaturated polymerizable groups that react with the monomers contained in the backbone, the macromonomer, or both the backbone and the macromonomer.

3. The dispersant of claim 1 wherein said urea functional compound is selected from the group consisting of acrylamide derivatives of 2-aminoethylethylene urea, methacrylamide derivatives of 2-aminoethylethylene urea, acrylate esters of 2-hydroxyethylethylene urea, and methacrylate esters of 2-hydroxyethylethylene urea.

4. The dispersant of claim 3 wherein said urea functional compound is selected from the group consisting of methacryloxy ethyl ethylene urea, methacrylamide ethyl ethylene urea, acrylamide ethyl ethylene urea, ethylene urea ethyl methacrylate, and ethylene urea ethyl acrylate.

5. The dispersant of claim 1 wherein said imid functional compound is selected from the group consisting of succinimid, phtalimid, and derivatives of maleic anhydride.

6. The dispersant of claim 5 wherein said derivatives of maleic acid are selected from the group consisting of phenyl maleimide, methyl maleimide, ethyl maleimide, and benzyl maleimide.

7. The dispersant of claim 1 wherein said macromonomer has a weight average molecular weight of about 500 to 20000.

8. The dispersant of claim 1 wherein said macromonomer has a hydroxyl value of about 20–180.

9. The dispersant of claim 1 wherein said dispersant has a weight average molecular weight of at least about 1500.

10. The dispersant of claim 1 further comprising functional monomers selected from the group consisting of alkoxysilanes, amines, carboxylic acid, sulfonic acid, phosphoric acid, epoxies, acetoacetoxies, amides, and alkoxymethylamides.

11. The dispersant of claim 1 wherein said macromonomer further comprises polymerized methacrylate monomers, said macromonomer having a weight average molecular weight of about 500 to 20000 and a hydroxyl value of 20–180.

12. The dispersant of claim 1 wherein said polymeric backbone further comprises monomers selected from the group consisting of acrylates, methacrylates, vinyl aromatics, and mixtures thereof, said dispersant having a weight average molecular weight of at least 1500 and a hydroxyl value of 20–180.

13. The dispersant of claim 11 wherein said urea functional compound is selected from the group consisting of methacryloxy ethyl ethylene urea, methacrylamide ethyl ethylene urea, acrylamide ethyl ethylene urea, ethylene urea ethyl methacrylate, and ethylene urea ethyl acrylate, said dispersant comprising 5 to 50 weight percent of said polymeric backbone and 50–95 weight percent of said macromonomer.

14. The dispersant of claim 11 wherein said imid functional compound is the reaction product of glycidylmethacrylate and phtalimid, said dispersant comprising 5 to 50 weight percent of said polymeric backbone and 50–95 weight percent of said macromonomer.

15. A process for producing a pigment dispersant, comprising the steps of:
 a) polymerizing a macromonomer is the presence of a cobalt chain transfer agent such that said macromonomer contains one terminal ethylenically unsaturated group; and
 b) grafting said macromonomer onto a polymeric backbone comprising ethylenically unsaturated monomers, and
 c) adding a dispersing substituent during step a), b), or both a) and b) such that said dispersing agent attaches to the macromonomer, the backbone, or both the macromonomer and the backbone, said dispersing substituent selected from the group consisting of
  i) imid functional compounds represented by the formula

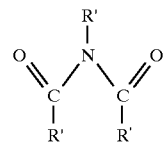

ii) urea functional compounds represented by the formula

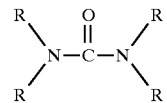

and iii) mixtures of i) and ii),
wherein each R and each R' is independently selected from the group consisting of hydrogen; saturated, substituted aliphatic and alicyclic compounds; saturated, unsubstituted aliphatic and alicyclic compounds; unsaturated, substituted aliphatic and alicyclic compounds; unsaturated, unsubstituted aliphatic and alicyclic compounds; substituted aromatic and heterocyclic compounds; unsubstituted aromatic and heterocyclic compounds; and divalent radicals including —NH—, oxygen and sulfur.

16. The process of claim 15 wherein the polymerization reactions are carried out in an organic solvent.

17. A pigment dispersion comprising the pigment dispersant of claim 1 and a pigment.

* * * * *